H. W. COMSTOCK.
SUPPOSITORY MOLD.
No. 188,594. Patented March 20, 1877.
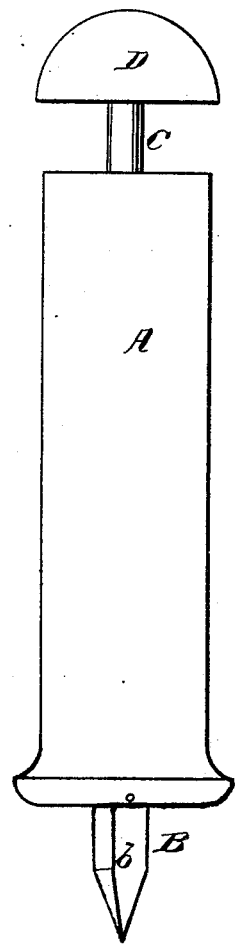
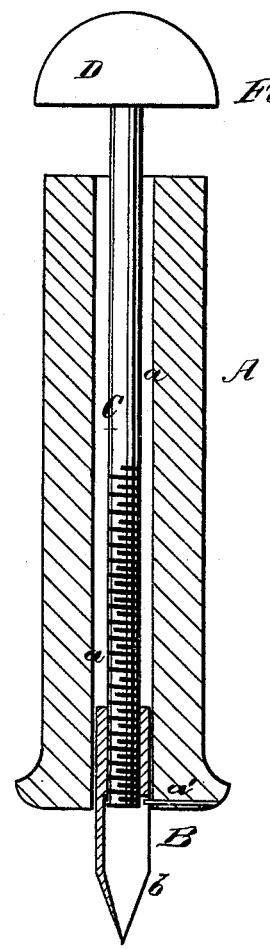
WITNESSES
E. H. Bates
George E. Upham
INVENTOR
Henry W. Comstock
Gilmore, Smith & Co.
ATTORNEYS.

UNITED STATES PATENT OFFICE.

HENRY W. COMSTOCK, OF LA FAYETTE, INDIANA.

IMPROVEMENT IN SUPPOSITORY-MOLDS.

Specification forming part of Letters Patent No. 188,594, dated March 20, 1877; application filed August 5, 1876.

*To all whom it may concern:*

Be it known that I, HENRY W. COMSTOCK, of La Fayette, in the county of Tippecanoe and State of Indiana, have invented a new and valuable Improvement in Suppository-Molds; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of my suppository-mold, and Fig. 2 is a central vertical sectional view of the same.

This invention consists in a process of manufacturing suppositories for the cure of piles and similar diseases; also, in a device for preparing molds for said suppositories, as hereinafter particularly described.

In the accompanying drawings, A designates a tubular stock, constructed of wood or other suitable material. In the tube *a* of said stock, at the lower end thereof, is an internally-threaded pointed tube, B, which is longitudinally adjustable therein, so as to extend a greater or less distance below the end of said stock. This adjustment is effected by means of a screw-threaded rod or tube, C, which engages with the threads of tube B, advancing or withdrawing it, according to the direction in which rod C is turned. A head or semi-globular handle, D, is secured on the top of said rod to facilitate the turning of the same. Tube B is cut away on one side at *b*, so that it will operate as an excavating-tool, and is prevented from turning in stock A by means of a pin, lug, or feather, *a'*, which enters the recessed part of the tube B. The same result may be effected by making a pin or feather on the outside of the tube B, and a longitudinal channel (in which said pin works) in the inside of tubular stock A. The tube B is of the same diameter as the suppositories are designed to have.

The process of manufacture is as follows: A pan or other receptacle is first supplied with clay, putty, or similar material of a plastic or semi-plastic nature, the surface of which is then made smooth by rolling or pressure. Tube B is then pressed into this clay, turned and withdrawn, leaving a cavity that exactly corresponds to the shape of a suppository—in other words, a suppository-mold. As many of these may be made as the manufacturer desires, or the surface of the clay will allow. The cocoa-butter, or other material of which the suppositories are composed, is then poured into these molds in a liquid or semi-liquid state, and the molds are set aside until the suppositories harden by cooling. The molds are then broken up, and the suppositories extracted.

It is obvious that pills or boluses of any kind can be manufactured by the above process, the shape of the tube B being slightly changed, if desired. By adjusting the tube as hereinbefore described, the suppository may be made longer or shorter. The clay mold may be used over again.

Hard soap is adapted to be used as a substitute for clay in the above-described process, and my invention includes such substitution. I prefer to mix glycerine with the clay, or other plastic or semi-plastic substance, which is used to form the molds, for the purpose of keeping said substance permanently in a plastic state, as it does not evaporate at an ordinary temperature. Instead of breaking up the clay, or other plastic or semi-plastic substance in which the molds are formed, I may extract the suppositories by using nippers provided with jaws which have concave cylindrical grasping-faces.

What I claim as new, and desire to secure by Letters Patent, is—

1. The process of manufacturing pills or suppositories, by first preparing a smooth surface of clay, soap, plaster, putty, or other plastic or semi-plastic material; next cutting out suitable molds therein with an excavating-tube; then pouring the material of said suppositories or pills into said molds while said material is in a fluid or semi-fluid state; then allowing said material to cool and solidify in said molds; and, finally, by breaking said molds or otherwise extracting said suppositories or pills in a solid form, substantially as and for the purpose set forth.

2. A suppository-mold composed of plastic or semi-plastic material mixed with glycerine, said glycerine being used to prevent said material from becoming dry and hard, substantially as set forth.

3. The combination of tubular stock A, screw threaded excavating-tube B, and adjusting screw-threaded rod C, substantially as and for the purpose set forth.

In testimony that I claim the above I have hereunto subscribed my name in the presence of two witnesses.

HENRY W. COMSTOCK.

Witnesses:
   C. GROENENDYKE,
   E. GROENENDYNE.